W. L. CASWELL.
METHOD OF FORMING UNIVERSAL CRANK PIN COUPLINGS.
APPLICATION FILED JUNE 15, 1907.
1,031,982. Patented July 9, 1912.
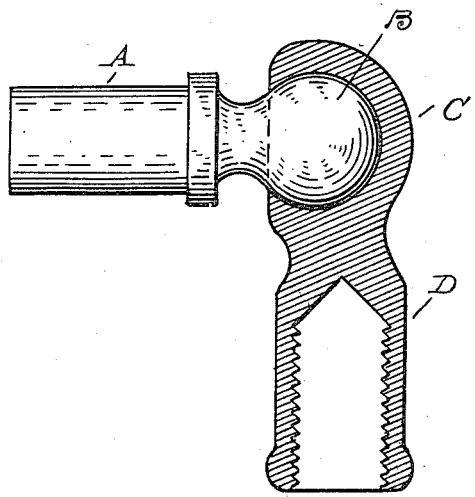
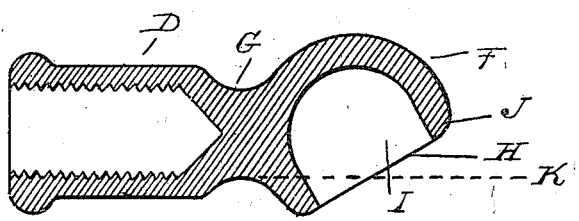
Witnesses
James P. Barry
Nellie Kinsella
Inventor
William L. Caswell
By Whittemore Hulbert Whittemore
attys.

UNITED STATES PATENT OFFICE.

WILLIAM L. CASWELL, OF DETROIT, MICHIGAN, ASSIGNOR TO PENINSULAR MILLED SCREW COMPANY, OF DETROIT, MICHIGAN, A CORPORATION OF MICHIGAN.

METHOD OF FORMING UNIVERSAL CRANK-PIN COUPLINGS.

1,031,982.   Specification of Letters Patent.   Patented July 9, 1912.

Application filed June 15, 1907. Serial No. 379,281.

*To all whom it may concern:*

Be it known that I, WILLIAM L. CASWELL, a citizen of the United States of America, residing at Detroit, in the county of Wayne and State of Michigan, have invented certain new and useful Improvements in Methods of Forming Universal Crank-Pin Couplings, of which the following is a specification, reference being had therein to the accompanying drawings.

It is the object of the invention to obtain a universal jointed coupling, particularly designed for attaching rods or pitmen to the crank pins, where the movement of the rod is not confined to the plane of rotation or where it is difficult to line up the parts. To this end, the invention consists in the method of manufacture as hereinafter set forth.

In the drawings, Figure 1 is a longitudinal section through the coupling; Fig. 2 is a similar view illustrating the method of manufacture.

A is a pin member, which is provided at its outer end with a spherical portion B. C is a socket member embracing this spherical portion B, and provided with a shank D, preferably socketed and internally threaded, for engaging with the end of the connecting rod. In the manufacture of these parts, the socket member C is formed preferably by turning from a solid rod, and forming a spherical portion F with a neck G of reduced diameter, uniting the same with the shank. A portion of this spherical part F is then cut away, as at H, upon a plane which is at an angle to the longitudinal axis of the rod. A recess I is then formed in the remaining portion, which is of sufficient diameter to receive the spherical portion B of the member A, and when the latter is placed in engagement with the recess, it is locked in engagement therewith by spinning down the annular flange J.

The plane in which the portion is cut away from the portion F being at an angle to the longitudinal axis, and the recess I being formed in the remaining portion, this would naturally arrange the pin A at an obtuse angle to the axis of the shank D, instead of perpendicular thereto. To bring the two into perpendicular relation, the socket member is bent at the neck G until the plane H is substantially parallel to the axis of the shank B, which will arrange the pin A at right angles thereto.

The object of forming the coupling by the method above given is to provide a full annular flange J for spinning down without reducing the neck G to an extent which would weaken the connection. If, instead of taking the plane H at the angle shown the member F were cut away, as in a plane indicated by the dotted lines K, the remaining portion would be just the same size, but instead of having a complete annular flange J, a portion of this would intersect with the neck G. Thus, it would be impossible to spin down the flange unless the neck G were further cut away to provide a clearance. By my method of manufacture this difficulty is avoided.

The bending of the neck G may be performed at any stage in the operation, either before or after the forming of the recess I, and even before the cutting away of the part of the spherical portion F. In the latter case, however, instead of cutting away in a plane at an angle to the axis of the socket D, the cut could be parallel to said axis.

What I claim as my invention is:

1. The method of forming universal pivotal couplings, which consists in forming an integral spherical member and shank, recessing said spherical part to receive the spherical end of the coöperating member, and to form an annular flange around the recess, closing the annular flange about said coöperating member to lock the same in the socket, and bending the shank, for the purpose set forth.

2. The method of forming universal pivotal couplings, which consists in forming an integral spherical member and shank, cutting away a portion of the spherical part at an angle to the axis of the shank and recessing the remaining portion to receive the spherical end of the coöperating member and to form an annular flange surrounding the recess, closing the annular flange about said coöperating member to lock the same in the socket, and bending said shank, for the purpose set forth.

In testimony whereof I affix my signature in presence of two witnesses.

WILLIAM L. CASWELL.

Witnesses:
 NELLIE KINSELLA,
 JAMES P. BARRY.